(12) United States Patent
Zhao

(10) Patent No.: US 12,704,444 B2
(45) Date of Patent: Aug. 11, 2026

(54) REFRIGERATION CHIP, REFRIGERATION SYSTEM, AND SAMPLE TESTING SYSTEM AND METHOD

(71) Applicant: Zhuhai Thud Technology Co., Ltd, Zhuhai (CN)

(72) Inventor: Meng Zhao, Zhuhai (CN)

(73) Assignee: GUANGZHOU OPTOCRYO BIOLOGICAL TECHNOLOGY CO., LTD., Guangzhou (CN)

( * ) Notice: Subject to any disclaimer, the term of this patent is extended or adjusted under 35 U.S.C. 154(b) by 372 days.

(21) Appl. No.: 18/259,756

(22) PCT Filed: May 10, 2021

(86) PCT No.: PCT/CN2021/092884

§ 371 (c)(1),
(2) Date: Jun. 28, 2023

(87) PCT Pub. No.: WO2022/142062

PCT Pub. Date: Jul. 7, 2022

(65) Prior Publication Data

US 2024/0060862 A1 Feb. 22, 2024

(30) Foreign Application Priority Data

Dec. 28, 2020 (CN) ........................ 202011597320.1

(51) Int. Cl.
*G01N 1/42* (2006.01)
*F25B 21/02* (2006.01)

(52) U.S. Cl.
CPC ............... *G01N 1/42* (2013.01); *F25B 21/02* (2013.01)

(58) Field of Classification Search
None
See application file for complete search history.

(56) References Cited

U.S. PATENT DOCUMENTS 7,069,732 B2 * 7/2006 Walker .................... G01P 3/487 62/99
10,288,361 B2 * 5/2019 Wenzel ................. F28D 7/0066
(Continued)

FOREIGN PATENT DOCUMENTS

CN 108452853 A 8/2018
CN 111370280 A * 7/2020 ............ H01L 21/02
(Continued)

OTHER PUBLICATIONS

CN 111370280 with English Translation (Year: 2020).*

*Primary Examiner* — Mark A Shabman
(74) *Attorney, Agent, or Firm* — Seed IP Law Group LLP

(57) ABSTRACT

The embodiments of the present disclosure disclose a refrigeration chip, a refrigeration system, and a sample testing system and method. The refrigeration chip is in contact with a low-temperature cold source, is used for refrigerating a sample, and comprises a heating layer and a heat conducting layer that are disposed in sequence. The heating layer comprises at least one temperature control unit that is disposed on the heat conducting layer; and the heat generated by the temperature control unit is transferred to the low-temperature cold source along the thickness direction of the heat conducting layer. The described technology enables a particular time period to be selected for refrigeration and thawing during the in-situ observation and representation of a sample, and refrigeration and heating rates higher than 105° C./s are attained by means of an interface thermal resistance design, thus ensuring that the sample is not damaged. The described technology is a significant improvement to operations related to the refrigeration, thawing, in-situ microscopic observation and so on of biological samples, and has great significance and broad application prospects.

18 Claims, 6 Drawing Sheets

(56) References Cited

U.S. PATENT DOCUMENTS

| | | | | |
|---|---|---|---|---|
| 2008/0029248 | A1* | 2/2008 | Magnant | F25D 23/00<br>165/104.19 |
| 2016/0351374 | A1* | 12/2016 | Wang | C23F 1/40 |
| 2018/0221871 | A1* | 8/2018 | Roberts | B01L 7/54 |
| 2023/0105915 | A1* | 4/2023 | Fu | F24F 1/031<br>62/3.2 |

FOREIGN PATENT DOCUMENTS

| | | | | |
|---|---|---|---|---|
| CN | 111879796 | A * | 11/2020 | H01L 21/0275 |
| WO | WO 8702122 | A1 | 4/1987 | |

* cited by examiner

Heating Element

Terminal Terminal Terminal Terminal

I+ V+ V- I-

REFRIGERATION CHIP, REFRIGERATION SYSTEM, AND SAMPLE TESTING SYSTEM AND METHOD

CROSS-REFERENCE TO RELAYED APPLICATIONS

This application claims the priority of Chinese Patent Application No. "CN 202011597320.1" filed on Dec. 28, 2020, the entire contents of which are incorporated into this application as a whole.

FIELD OF THE INVENTION

The present disclosure relates to the technical field of biomedicine, and in particular, to a refrigeration chip, a refrigeration system, a sample testing system and method.

BACKGROUND OF THE INVENTION

The rapid freezing and heating technology of biological samples has many important applications in the biomedical field, such as cell cryopreservation and resurrection, protein cryofixation characterization, etc.

The current biological freezing technologies mainly include plunge freeze, jetting freeze and high pressure freeze. Plunge freeze is the most commonly used sample preparation method in the industry. During plunge freeze, the sample stage (microgrid) carrying the biological sample is usually fixed at the front end of the sample rod, and the sample is quickly inserted into cryogenic liquid, such as liquid ethane, or liquid nitrogen, under mechanical control, so as to complete the freezing of biological samples. In jetting freeze, the sample stage carrying biological samples is usually transferred to a specific position in the freezing chamber by a sample rod, and then the samples are sprayed with high-pressure liquid nitrogen vapor at high speed, thereby completing the freezing of biological samples. High pressure freeze is similar to the principle of plunge freeze. During high pressure freeze, cryogenic liquid is used to freeze the samples, but while freezing, a high pressure of about 2000 atmospheres is applied in the sample cavity to reduce the freezing temperature of water and inhibit the volume expansion in the process of ice crystallization. Thereby, the damage to the structure of biological samples by ice crystallization is avoided, and frozen biological samples of higher quality can be prepared.

However, plunge freeze has the following drawbacks: because the sample needs to be entirely inserted into the cryogenic liquid, it is impossible to selectively freeze specific regions of the sample during the freezing process, and in situ real-time microscopic observation cannot be performed during the freezing process. On the basis of plunge freeze, jetting freeze uses liquid nitrogen vapor instead of cryogenic liquid to improve heat transfer efficiency. The principle of high pressure freeze is similar to the above mentioned two freezing methods. Because the high pressure inhibits ice crystallization, the freezing effect is better and the sample quality is higher. However, jetting freeze and high pressure freeze also have the defects of not being able to real-time microscopic observation and local selective freezing. These deficiencies limit further in-depth studies of frozen biological samples.

A device for rapidly freezing samples is also proposed in the prior art, which includes: a sample container and a heating support device located on the side of the sample container to support the sample container, the sample container is placed on the base, and by controlling the switch of the heating support device, rapid freezing of samples is achieved. Since the heating support device is located on the side of the sample container, the freezing speed of the freezing the sample is not ideal.

In addition, in terms of heating and recovering frozen biological samples, the current conventional method has a relatively slow heating speed. Usually, auxiliary media such as DMSO need to be added to the sample to ensure that the biological sample will not be damaged during the heating process, which has an impact on the activity of the biological sample. The true performance of biological samples such as cells in a normal environment cannot be expressed.

In addition, the prior art also proposes a freezing sample preparation system, which realizes visual rapid freezing of samples. The system uses a cold source, a heat insulation layer, a heating coil and PDMS to close the sample cavity. By the means of turning on the heating coil to keep the sample at room temperature, and turning off the heating coil to freeze, a freezing process from 25° C. to near liquid nitrogen temperature is successfully realized. A maximum freezing speed of 2*10° C./s is achieved in the temperature range of 25° C. to −21° C., and then as the temperature decreases, the freezing rate also gradually decreases. The core of this system is a sample cavity sealed by PDMS with a wall thickness of 3 microns. Since the cavity needs to carry a liquid layer with a thickness of 30 microns, the bottom of the cavity needs to maintain certain mechanical properties, so the thickness of the bottom cannot be further reduced. However, the thermal conductivity of PDMS is only 0.15 W/Km, which severely limits the further improvement of the freezing rate. In order to keep the sample structure from being destroyed during the freezing process at lower freezing rates, antifreeze is added into the sample liquid in the system, which affects the viability of biological samples. At the same time, this structure cannot achieve extremely fast heating. In addition, the hardness of PDMS is low, and it is easy to bend and deform during processing and operation, which leads to the failure of good fit between the liquid cavity and the heating coil, and also has a certain impact on the stability and thermal conductivity of the system.

SUMMARY OF THE INVENTION

In order to solve the problems in the related art, an embodiment of the present disclosure provides a refrigeration chip, a refrigeration system, a sample testing system and method.

In a first aspect, an embodiment of the present disclosure provide a refrigeration chip.

Specifically, the refrigeration chip is in contact with a low-temperature cold source for freezing a sample, including: a heating layer and a thermal conductive layer arranged in sequence;

wherein, the heating layer comprises at least one temperature control unit disposed on the thermal conductive layer; the heat generated by the temperature control unit is transferred to the low-temperature cold source along the thickness direction of the thermal conductive layer.

Alternatively, when the number of the temperature control units is one, its surface area is less than or equal to the surface area of the thermal conductive layer.

Alternatively, the temperature control unit is an assembly formed by a plurality of heating elements arranged in an array or a heating element having a predetermined surface area.

Alternatively, the refrigeration chip further comprises:

a sample placement layer, which is located on the heating layer, and the surface of the sample placement layer has a local temperature control region for placing the sample, and the area of the local temperature control region is adapted to the surface area of the temperature control unit.

Alternatively, the local temperature control region is provided with at least one closed sample containing cavity and/or open sample containing cavity for containing the sample.

Alternatively, the temperature control unit further comprises an auxiliary temperature control unit disposed on the wall of the closed sample containing cavity and/or the open sample containing cavity.

Alternatively, the refrigeration chip further comprises:

a thermal insulation element, which is arranged between the adjacent temperature control units.

Alternatively, the thermal conductivity of the thermal insulation element is not greater than the thermal conductivity of the thermal conductive layer, preferably the lateral thermal conductivity of the thermal insulation element is smaller than the lateral thermal conductivity of the thermal conductive layer.

Alternatively, the refrigeration chip further comprises:

a chip substrate, thermal conductivity of which is greater than thermal conductivity of the thermal conductive layer, is used to support the thermal conductive layer.

Alternatively, an accommodating chamber is provided in the chip substrate for accommodating a low-temperature cold source.

Alternatively, the sample placement layer, the heating layer, the thermal conductive layer, and the chip substrate are of an integrated structure; or the sample placement layer, the heating layer, the thermal conductive layer, and the chip substrate are arranged in sequence and separately.

Alternatively, the refrigeration chip is provided with optical path channels to adapt to microscopes, photodetectors, X-rays, Raman spectrometers, and infrared spectrometers.

Alternatively, the refrigeration chip is made of a light-transmitting material or has perforated channels as the optical path channels.

Alternatively, the refrigeration chip is made by a chip micro-nano processing technology.

Alternatively, the thickness of the refrigeration chip is controlled at 0.1 to 2 mm.

In a second aspect, an embodiment of the present disclosure provides a sample stage assembly, including the refrigeration chip according to the first aspect.

Specifically, the sample stage assembly comprises:

a controller electrically connected to the temperature control unit, which is used to adjust the temperature of the temperature control unit.

Alternatively, the sample stage assembly further comprises: a sample heat sink for accommodating the refrigeration chip.

In a third aspect, an embodiment of the present disclosure provides a refrigeration system including the sample stage assembly according to the second aspect.

Specifically, the refrigeration system comprises:

a low-temperature cold source;

a heat sink base for fixing the sample stage assembly, which is in contact with the low-temperature cold source.

Alternatively, the refrigeration system further comprises:

a freezing medium sealing cover plate, which is used for sealing the low-temperature cold source.

Alternatively, the refrigeration system further comprises:

a sample cover, the area of which is capable of at least sealing the opening of the heat sink base.

In a fourth aspect, an embodiment of the present disclosure provides a sample testing system, including the refrigeration system described according to the third aspect.

Specifically, the sample testing system comprises;

a microscopic observation device and/or a detection device used in conjunction with the refrigeration system.

Alternatively, the microscopic observation device is at least one of an upright optical microscope and an electron microscope;

the detection device is at least one of a photodetector, an X-ray, a Raman spectrometer, and an infrared spectrometer.

In a fifth aspect, an embodiment of the present disclosure provides a method for freezing a sample using the refrigeration system according to the third aspect.

Specifically, the method comprises:

adjusting the electrical parameters of the temperature control unit to maintain the average temperature of the sample to be stable at the first temperature, and to maintain the temperature gradient between the sample and the low-temperature cold source in the sample placement layer;

detecting and adjusting the electrical parameters to a first predetermined range to adjust the average temperature of the sample at a second temperature, wherein the second temperature is lower than the first temperature, and the required temperature value is determined within the lowest temperature range that the low-temperature cold source can provide.

Alternatively, before adjusting the electrical parameters of the temperature control unit to maintain the average temperature of the sample to be stable at the first temperature, and to maintain the temperature gradient between the sample and the low-temperature cold source in the sample placement layer, the method further comprises:

adjusting the temperature of the local temperature control region to the first temperature;

placing a sample within the local temperature control region.

Alternatively, the first temperature is changed to the second temperature within a predetermined time period.

Alternatively, the predetermined time period is within 10 ms.

Alternatively, the electrical parameters of the temperature control unit are adjusted by an electronic equipment.

Alternatively, the first temperature is the liquid temperature of the sample, and the second temperature enables the same sample to be directly transformed from the liquid state to the amorphous solid state in the same environment, and the temperature of the amorphous solid state is continuously maintained.

Alternatively, the first temperature is 0° C. to 40° C., and the second temperature is lower than −140° C.

Alternatively, before adjusting the electrical parameters of the temperature control unit to maintain the average temperature of the sample to be stable at the first temperature, and to maintain the temperature gradient between the sample and the low-temperature cold source in the sample placement layer, the method further comprises:

adjusting the temperature of the local temperature control region to the first temperature;

placing a sample within the local temperature control region.

Alternatively, the first temperature is changed to the second temperature within a predetermined time period.

Alternatively, the predetermined time period is within 10 ms.

Alternatively, the electrical parameters of the temperature control unit are adjusted by an electronic equipment.

Alternatively, the first temperature is the liquid temperature of the sample, and the second temperature enables the same sample to be directly transformed from the liquid state to the amorphous solid state in the same environment, and the temperature of the amorphous solid state is continuously maintained.

Alternatively, the first temperature is 0° C. to 40° C., and the second temperature is lower than −140° C.

In a sixth aspect, an embodiment of the present disclosure provides a method for heating a sample using the freezing system of the third aspect.

Specifically, the method comprises:

adjusting the electrical parameters of the temperature control unit to a second predetermined range, and then detecting and adjusting the electrical parameters to maintain the average temperature of the sample at the first temperature; or, heating the sample by an external heat source, and determining the average temperature of the sample to be at a first temperature by a temperature measuring unit; wherein, the first temperature is greater than the second temperature Alternatively, the method further comprises:

detecting and adjusting the electrical parameters so that the average temperature of the local temperature control region reaches the second temperature.

Alternatively, the second temperature is changed to the first temperature within a predetermined time period.

Alternatively, the predetermined time period is within 10 ms.

Alternatively, the first temperature is the liquid temperature of the sample, and the second temperature is the temperature at which the same sample is directly transformed from the liquid state to the amorphous solid state in the same environment, and the amorphous solid state is maintained continuously.

Alternatively, the first temperature is 0° C. to 40° C., and the second temperature is lower than −140° C.

In a seventh aspect, an embodiment of the present disclosure provides a method of operating a sample by using the sample testing system according to the fourth aspect.

Specifically, the method comprises:

adjusting the electrical parameters of the temperature control unit to maintain the average temperature of the sample at the first temperature, and to maintain the temperature gradient between the sample and the low-temperature cold source in the sample placement layer;

detecting and adjusting the electrical parameter to a first predetermined range to adjust the average temperature of the sample at a second temperature, and then operating the sample at the second temperature, wherein the second temperature is lower than the first temperature, and the required temperature value is determined within the lowest temperature range that the low-temperature cold source can provide.

Alternatively, the method further comprises:

adjusting the electrical parameters of the temperature control unit to a second predetermined range to heat the sample or use an external heat source to heat the sample to a first temperature, and then repeatedly detecting and adjusting the electrical parameters to the first predetermined range to maintain the average temperature of the sample at the second temperature, and then the sample is operated at the second temperature.

Alternatively, the method further comprises:

after adjusting the electrical parameters of the temperature control unit to maintain the average temperature of the sample at the first temperature, and to maintain the temperature gradient between the sample and the low-temperature cold source in the sample placement layer, operating the sample at the first temperature and determining a start-up time for adjusting the electrical parameter to a first predetermined range, and at the start-up time, detecting and adjusting the electrical parameter to the first predetermined range to maintain the average temperature of the sample at a second temperature.

Alternatively, the method further comprises:

after the sample is operated, the sample is replaced.

Alternatively, the first temperature is changed to the second temperature within a first predetermined time period.

Alternatively, the electrical parameters of the temperature control unit are adjusted by an electronic equipment.

Alternatively, the second temperature is changed to the third temperature within a second predetermined time period.

Alternatively, the second predetermined time period is within 10 ms.

Alternatively, the first temperature is the liquid temperature of the sample, and the second temperature is the temperature at which the same sample is directly transformed from the liquid state to the amorphous solid state in the same environment, and the amorphous solid state is maintained continuously.

Alternatively, the first temperature is 0° C. to 40° C., and the second temperature is lower than −140° C.

Alternatively, the method is suitable for microscopic observation of samples.

Alternatively, the method further comprises when adjusting the electrical parameters of the temperature control unit to maintain the average temperature of the sample at the first temperature and maintain the temperature gradient between the sample and the low-temperature cold source in the sample placement layer, evaluating the thermal conductivity between the refrigeration chip and the cold source according to the electrical parameters.

The technical solutions provided by the embodiments of the present disclosure may comprise the following beneficial effects:

(1) In the refrigeration chip according to the embodiment of the present disclosure, by setting at least one temperature control unit, the sample can be selectively frozen, and for the sample that does not need freezing, the temperature control unit is controlled to release heat to maintain the temperature gradient between the sample and the low-temperature cold source. For samples that need to be frozen, the electrical parameters of the temperature control unit are adjusted so that the heat of the sample is conducted to the low-temperature cold source, thereby realizing the effect of local selective freezing.

(2) The refrigeration chip according to the embodiment of the present disclosure can not only freeze a large-area sample, but also freeze multiple independent small samples. The heat of the samples is conducted along the thickness direction of the thermal conductive layer, and the freezing speed can be higher than $10^{5}$° C./s. For cell samples, rapid freezing samples will not damage the cell samples, which is convenient for better study of cell biological behavior.

(3) In the refrigeration chip according to the embodiment of the present disclosure, the refrigeration chip is provided with an optical path channel, so that a test device can be adapted to perform in-situ characterization of the sample, such as a microscope, X-ray device, etc., so that the samples can be tested in situ and in real time while freezing the samples, which improves the efficiency of sample testing.

(4) The method used to operate the sample by the sample testing system according to the embodiment of the present disclosure, by adjusting the parameters of the temperature control unit, the operation flow of the freezing the sample—operating the sample, or the cycle of the procedure of freezing the sample—operating the sample—heating to revive the sample—freezing the sample—operating the sample—heating to revive the sample, or the operation flow of operating the sample before freezing—freezing the sample—operating the sample, or the cycle of the procedure of operating the sample before freezing—freezing the sample—operating the sample—heating to revive the sample-operating the sample before freezing—freezing the sample—operating the sample—heating to revive the sample can be realized. Or, after freezing the sample—operating the sample, the above procedure can be repeated after changing the sample. This technical solution limits the heat capacity of the local temperature control region by designing the thermal resistance and heat exchange efficiency of each interface among the local temperature control region, the chip substrate and the low-temperature cold source, and obtains the freezing and heating speed higher than $10^{5}$° C./s, to ensure that the sample structure and function are not damaged during repeated freezing and heating processes, which is a major improvement for biological sample freezing, in-situ observation and heating and thawing operations, which is of great significance and broad application prospects.

(5) In the refrigeration chip according to the embodiment of the present disclosure, by setting the heating layer and the sample layer as an integrated design, the two layers are directly combined, which can improve the repeatability of the performance of the refrigeration chip, ensure the stability of heat conduction, and at the same time is of benefit to speed up the freezing speed.

(6) In the refrigeration chip according to the embodiment of the present disclosure, the contact surface between the heating layer and the cold source is separable. Before freezing the sample, the contact quality at the interface can be evaluated by the heating power in the constant temperature stage to ensure the freezing speed.

It is to be understood that the foregoing general description and the following detailed description are exemplary and explanatory only and are not restrictive of the present disclosure.

BRIEF DESCRIPTION OF THE FIGURES

In order to more clearly illustrate the technical solutions in the embodiments of the present disclosure or related technologies, the following will briefly introduce the accompanying drawings used in the description of the exemplary embodiments or related technologies. Obviously, the drawings described below are some exemplary embodiments of the present disclosure, for those of ordinary skill in the art, without creative effort, may also obtain other drawings based on these drawings.

DETAILED DESCRIPTION OF PREFERRED EMBODIMENTS

Figure 1A:
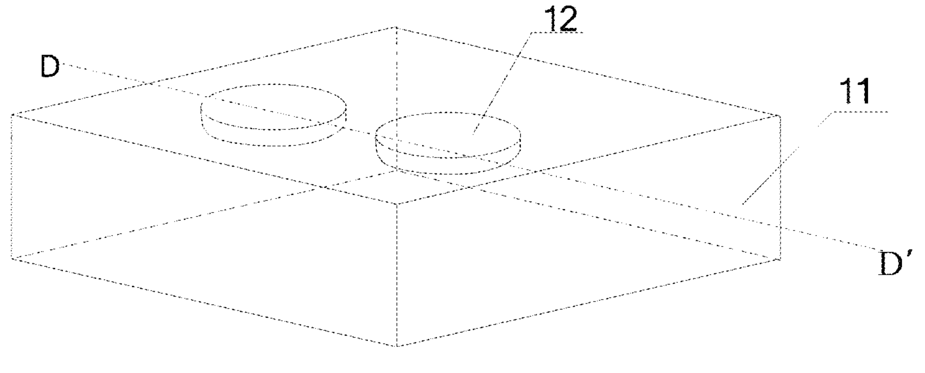
FIG. 1*a* shows a front view of a refrigeration chip according to an embodiment of the present disclosure.

In order for those skilled in the art to better understand the solutions of the present disclosure, the technical solutions in the exemplary embodiments of the present disclosure will be clearly and completely described below with reference to the accompanying drawings in the exemplary embodiments of the present disclosure.

In some of the processes described in the specification and claims of the present disclosure and the above-mentioned figures, various operations are included in a specific order, but it should be clearly understood that the operations may be performed out of the order in which they appear in the context, or be performed in parallel. The sequence numbers of the operations, such as 101, 102, etc., are only used to distinguish different operations, and the sequence numbers themselves do not represent any execution order. Additionally, these procedures may include more or fewer operations, and these operations may be performed sequentially or in parallel. It should be noted that the descriptions such as "first" and "second" in the context are used to distinguish different messages, devices, modules, etc., and do not represent a sequence, nor do they limit that "first" and "second" are different types.

The technical solutions in the exemplary embodiments of the present disclosure will be clearly and completely described below with reference to the accompanying drawings in the exemplary embodiments of the present disclosure. Obviously, the described exemplary embodiments are only a part of the embodiments of the present disclosure, rather than all embodiments. Based on the embodiments in the present disclosure, all other embodiments obtained by those skilled in the art without creative efforts shall fall within the protection scope of the present disclosure.

In the prior art, plunge freeze has the following drawbacks: because the sample needs to be entirely inserted into the cryogenic liquid, it is impossible to selectively freeze specific regions of the sample during the freezing process, and in situ real-time microscopic observation cannot be performed during the freezing process. On the basis of plunge freeze, jetting freeze uses liquid nitrogen vapor instead of cryogenic liquid to improve heat transfer efficiency. The principle of high pressure freeze is similar to the above mentioned two freezing methods. Because the high pressure inhibits ice crystallization, the freezing effect is better and the sample quality is higher. However, jetting freeze and high pressure freeze also have the defects of not being able to real-time microscopic observation and local selective freezing. These deficiencies limit further in-depth studies of frozen biological samples. At the same time, there is no mature technology that can recover frozen samples by high-speed heating.

The present disclosure is made to address, at least in part, problems identified in the prior art by the inventors.

The refrigeration chip provided by the present disclosure is different from the three methods of plunge freeze, jetting freeze and high pressure freeze in terms of the principle of freezing samples. The difference is that the sample placed on the refrigeration chip is not in direct contact with the freezing medium (such as liquid nitrogen), but while the freezing medium cools the sample stage (usually the chip is placed on the sample stage and the sample stage is immersed in the freezing medium), the sample is kept at a higher temperature by means of external resistance heating. After the resistance heating is turned off, the sample heat is rapidly transferred to the cryogenic sample stage, so that the sample rapidly freezes.

Figure 1B:
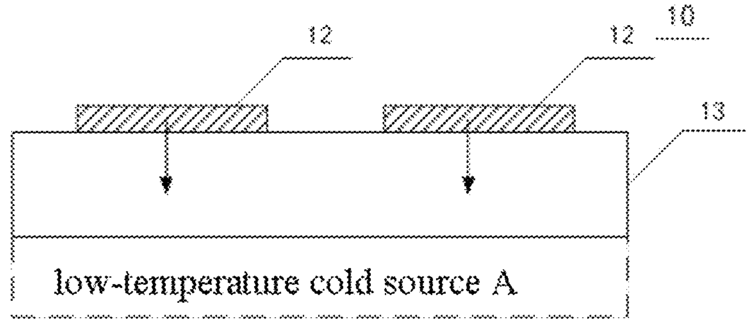
FIG. 1B shows a cross-sectional view in the DD' direction of FIG. 1.

FIG. 1*a* shows a front view of a refrigeration chip according to an embodiment of the present disclosure, and FIG. 1B shows a cross-sectional view in the DD' direction of FIG. 1*a*. The low-temperature cold source A shown in FIG. 1B is not a part of the refrigeration chip 10. In the present disclosure, the low-temperature cold source A is a device that provides a low-temperature environment for the refrigeration chip 10 and is in direct contact with the refrigeration chip 10. For example, when the refrigeration chip 10 is used, it is placed on the sample heat sink, the sample heat sink is then fixed on the heat sink base immersed in the low-temperature cold source. Therefore, the sample heat sink also has the temperature of the low-temperature cold source (such as liquid nitrogen), which can be regarded as the low-temperature cold source A. The above is a schematic illustration, and the present disclosure does not limit the low-temperature cold source A.

As shown in FIGS. 1*a*-1*b*, the refrigeration chip 10 comprises: a heating layer and a thermal conductive layer 13 arranged in sequence, wherein the heating layer comprises at least one temperature control unit 12 arranged on the thermal conductive layer 13; the temperature control unit 12 usually uses Joule heating (electric current generates heat through a resistance) to locally generate heat, and the heat is transferred to the low-temperature cold source A along the thickness direction of the thermal conductive layer 13 (the arrow direction shown in FIG. 1B). In a specific embodiment, the heating layer and the cold source are separable.

When using the refrigeration chip provided by the present disclosure, before freezing the sample, place the refrigeration chip on the low-temperature cold source A, and the temperature control unit 12 maintains the sample at a first temperature such as 20° C. to 30° C. The temperature gradient between the sample and the low-temperature cold source A is formed in the thickness direction of the thermal conductive layer 13. After the freezing starts, the electrical parameters of the temperature control unit 12 are adjusted, and the heat generated by the temperature control unit is conducted along the direction of the temperature gradient, so as to realize the rapid freezing of the sample. Then, the electrical parameters are detected and adjusted to adjust the temperature of the sample to the desired second temperature. For example, when the low-temperature cold source A can provide a low temperature of −190° C., the sample temperature can be adjusted to −140° C.

It should be noted that, the second temperature is determined according to the temperature of the low-temperature cold source A, and may not be lower than the temperature, which is not limited in the present disclosure.

In the refrigeration chip according to the embodiment of the present disclosure, by setting at least one temperature control unit, the sample can be selectively frozen. For samples that do not need freezing, the temperature control unit is controlled to release heat to maintain the temperature gradient between the sample and the low-temperature cold source. For samples that need freezing, the electrical parameters of the temperature control unit are adjusted so that the heat of the sample is conducted to the low-temperature cold source A, thereby realizing the effect of local selective freezing.

FIG. 2*a* to FIG. 2*e* illustrate schematic structural diagrams of a refrigeration chip according to an embodiment of the present disclosure.

Figure 2A:
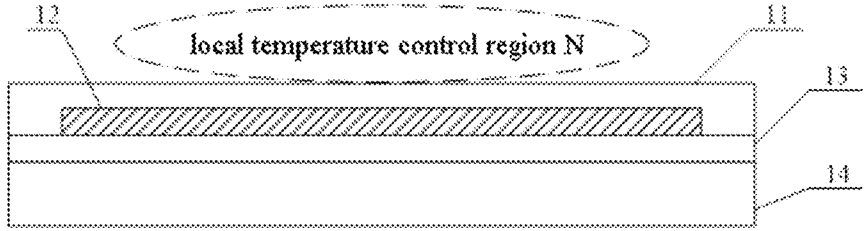
FIG. 2*a* to FIG. 2*e* show schematic structural diagrams of a refrigeration chip according to an embodiment of the present disclosure.

As shown in FIG. 2*a*, the refrigeration chip 10 comprises: a sample placement layer 11, a heating layer and a thermal conductive layer 13 and a chip substrate 14, which are arranged in sequence. The heating layer comprises at least one temperature control unit 12 arranged on the thermal conductive layer 13.

Wherein, the sample placement layer 11 is located on the heating layer, and is used to electrically isolate the temperature control unit 12, so as to prevent the temperature control unit 12 from being exposed to the external environment, thereby prolonging the service life of the refrigeration chip. The material of the sample placement layer 11 is silicon oxide or silicon nitride.

The surface of the sample placement layer 11 has a local temperature control region N for placing the sample, and the area of the region is adapted to the surface area of the temperature control unit 12. Specifically, the boundary range of the local temperature control region N can be marked on the sample placement layer 11, and the region enclosed by the boundary range is located directly above the temperature control unit 12 and is not larger than the surface area of the temperature control unit 12. The heat generated by the temperature control unit 12 heats the sample placed in the local temperature control region N, and then the electrical parameters of the temperature control unit 12 are adjusted to achieve rapid freezing of the sample. This way of freezing a sample can freeze a large area sample or freeze multiple independent small samples, which is not limited in the present disclosure. In some cases, the sample placement layer 11 can be omitted, and the sample can be placed directly on the temperature control unit 12.

It should be noted that the wire of the temperature control unit 12 may pass through the sample placement layer 11 and be connected to the controller outside the refrigeration chip 10. After placing the sample on the heating layer, the sample is heated by the heat generated by the temperature control unit. The heat generated by the wire is negligible.

Figure 2B:
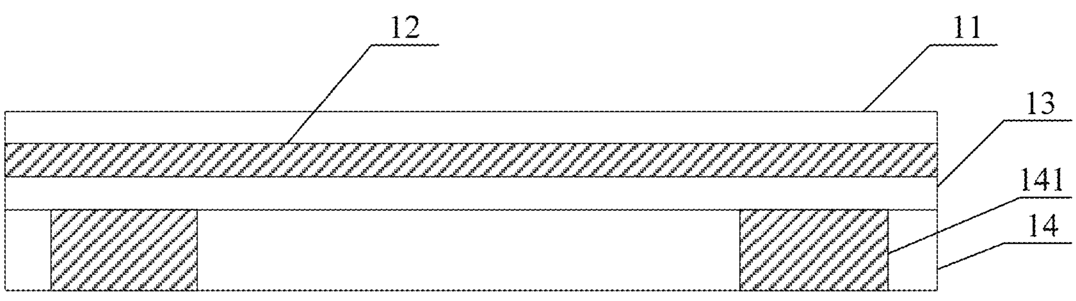

The temperature control unit 12 is disposed in the thermal conductive layer 13 by a chip micro-nano processing process. When the number of the temperature control units 12 is one, its surface area is less than or equal to the surface area of the thermal conductive layer 13 (as shown in FIG. 2*a*, FIG. 2*b*), which is not limited in the present disclosure. In addition, a plurality of temperature control units 12 can also be provided in correspondence to a plurality of local temperature control regions N, and each local temperature control region N can be independently controlled by the corresponding temperature control unit 12 to heat and stop heating, thereby independently adjusting the temperature of the samples placed in different local temperature control regions N. In some cases, the temperature of the samples in several local temperature control regions N may be adjusted in combination, which is not limited in the present disclosure.

The temperature control unit 12 is a heating element with a predetermined surface area, the thickness is usually 0.1-5 um, and the materials used are usually conductive materials, such as metals (aluminum, copper, platinum, etc.), metal compounds (titanium nitride, indium tin oxide, etc.) or a compound of one or more of semiconductors (silicon, silicon carbide, etc.).

The material of the thermal conductive layer 13 is selected from a material with lower thermal conductivity than that of the chip substrate 14, for example, it can be at least one of silicon oxide, silicon nitride, and polymer. The thickness of the thermal conductive layer 13 is usually 1-15 um. Wherein, the material of the thermal conductive layer 13 is preferably a high thermal conductive material, such as metal materials, to increase the freezing speed.

The thermal conductivity of the chip substrate 14 is greater than thermal conductivity of the thermal conductive layer 13. When the refrigeration chip 10 is in contact with the low-temperature cold source A, the temperature of the chip substrate 14 is close to the low-temperature cold source A, and the temperature gradient concentrates on the thickness direction of the thermal conductive layer 13, which is equivalent to reducing the conduction distance of the temperature gradient to the low-temperature cold source A. Thus, it can provide a faster freezing speed for the freeze sample. After testing, the sample freezing speed can exceed $10^{5\circ}$ C./s. At the same time, the chip substrate 14 can also be used to support the thermal conductive layer 13 to provide mechanical support for the refrigeration chip 10. The chip substrate 14 is used as the mechanical carrier part of the refrigeration chip 10. The thickness of the chip substrate 11 is usually 0.1 to 2 mm, and the material used is usually one of silicon (such as silicon wafer), silicon carbide, and high thermal conductivity ceramics. In some cases, the chip substrate 14 can be omitted, and the thermal conductive layer 13 can be directly contacted with the low-temperature heat source A.

Figure 10:
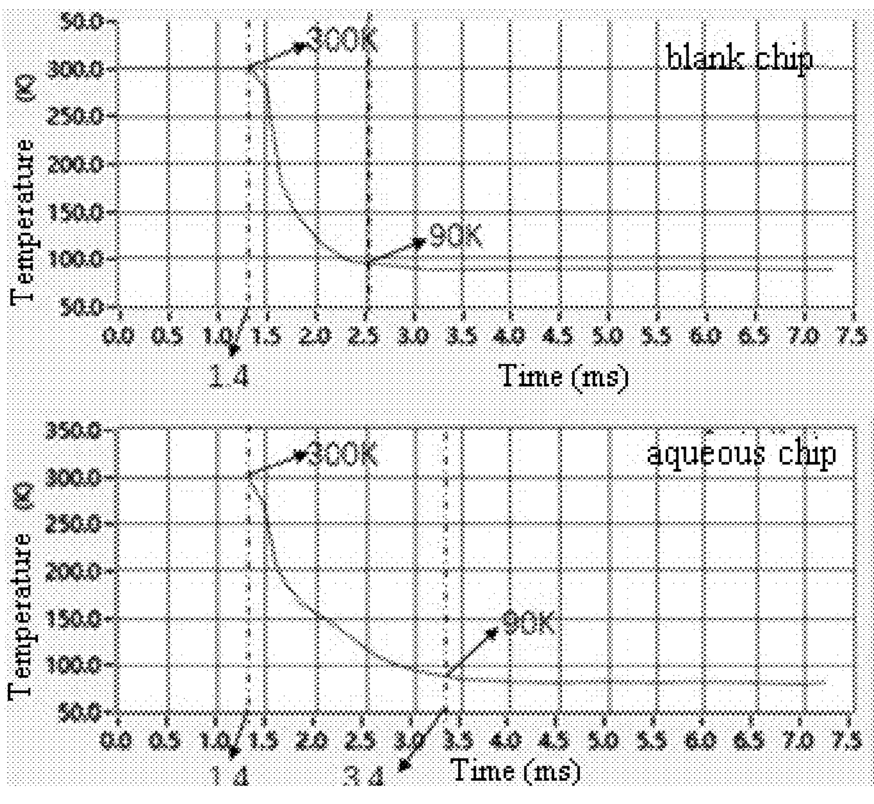
FIG. 10 shows a schematic diagram of the freezing rate of the refrigeration chip according to FIG. 2*a* to FIG. 2*e*.

The refrigeration chip according to the embodiment of the present disclosure can not only freeze a large-area sample, but also freeze multiple independent small samples, the sample heat is conducted along the thickness direction of the thermal conductive layer, and the freezing speed can be higher than $10^{5\circ}$ C./s, for cell samples, rapid freezing samples will not damage the cell samples, which is convenient for better study of cell biological behavior. Specifically, as shown in FIG. 10, for a blank chip, it took 1.1 ms for the temperature to drop from 300 K (corresponding to the time point 1.4 ms on the horizontal axis) to 90 K (corresponding to the time point 2.5 ms on the horizontal axis), and the freezing rate reached about $1.9\times10^{5\circ}$ C./s. Similarly, the aqueous chip for freezing the sample can freeze the sample temperature from 300 K (corresponding to the time point 1.4 ms on the horizontal axis) to 90 K (corresponding to the time point 3.4 ms on the horizontal axis) in only 2 ms, and the freezing rate reaches $1.1\times10^{5\circ}$ C./S. In the present disclosure, unless otherwise specified, a blank chip refers to a chip that does not carry a sample, and an aqueous chip refers to a chip that carries a liquid sample.

According to an embodiment of the present disclosure, as shown in FIG. 2*b*, the chip substrate 14 may be provided with an accommodating chamber 141 for accommodating a low-temperature cold source, such as liquid nitrogen, so that the temperature of the chip substrate 14 and the low-temperature cold source are closer, thereby improving the sample freezing speed.

Figure 2C:
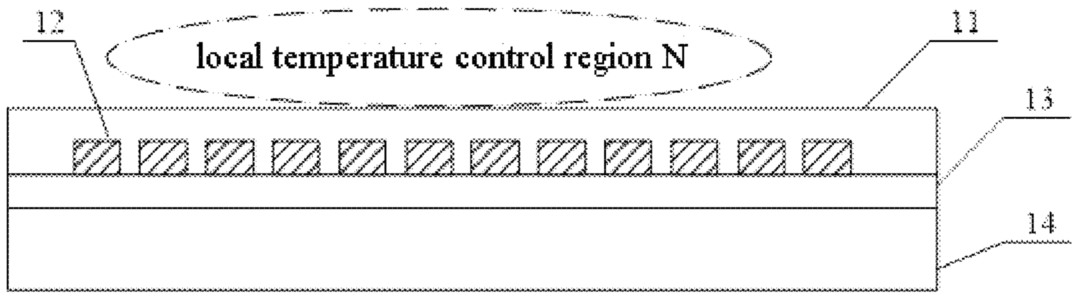

According to an embodiment of the present disclosure, as shown in FIG. 2*c*, the temperature control unit 12 is an assembly formed by arranging a plurality of heating elements in an array to provide more degrees of freedom to cooperate with the heating circuit. For example, it can be a plurality of conductive leads in series or parallel combination, the width of each heating element may be 2 μm or less, and the spacing between adjacent heating elements may be 2 μm or less, which is not limited in the present disclosure. The region on the sample placement layer 11 directly above the temperature control unit 12 is the local temperature control region N. The heat generated by the temperature control unit 12 is used to heat the sample placed in the local temperature control region N, and then the electrical parameters of the temperature control unit 12 is adjusted, so as to realize rapid freezing of the sample.

Figure 2D:
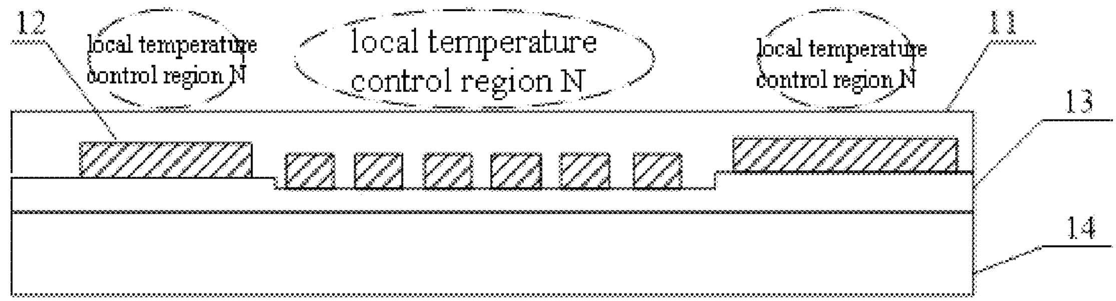

According to an embodiment of the present disclosure, as shown in FIG. 2*d*, the heating layer comprises a plurality of temperature control units 12, and the temperature control unit 12 may be a component formed by multiple heating elements arranged in an array, or can be a heating element with a predetermined surface area, so as to form a plurality of local temperature control regions N on the sample placement layer 11. Wherein the thickness of the thermal conductive layer 13 adapted to each local temperature control region N can be the same or different, so as to form local temperature control regions N with different thermal conductivities.

In the present disclosure, for the sample region that needs to be quickly frozen, a thermal conductive layer 13 with a smaller thickness and a relatively large thermal conductivity (relatively low thermal resistance) can be used to achieve more than $10^{5\circ}$ C./s high-speed freezing. For areas that do not require rapid freezing, a thermal conductive layer 13 with a larger thickness and a relatively small thermal conductivity (relatively high thermal resistance) can be used to freeze at a relatively slow speed, thus a lower heating power can be used to maintains the region at the first temperature, thereby reducing the power consumed by the temperature control unit 12.

In the refrigeration chip according to the embodiment of the present disclosure, a large-area sample can be placed in the local temperature control region N, or a plurality of independent small samples can be frozen, and then the temperature control unit 12 can be controlled to change the temperature of each local temperature control region N. The sample freezing or thawing operation is performed by adjusting the electrical parameters of the temperature control unit 12.

Figure 2E:
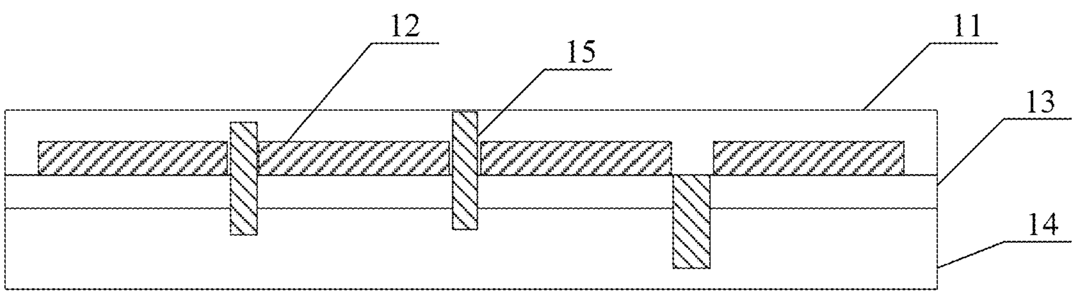

According to an embodiment of the present disclosure, as shown in FIG. 2*e*, the refrigeration chip 10 further comprises: a thermal insulation element 15 disposed between adjacent temperature control units 12. The material of the thermal insulation element 15 is selected to have a thermal conductivity not greater than thermal conductivity of the thermal conductive layer 13, for example, it can be at least one of silicon oxide, silicon nitride, and polymers. Preferably the lateral thermal conductivity of the thermal insulation element is less than the lateral thermal conductivity of the thermal conductive layer.

The thermal insulation element 15 is arranged to occupy or penetrate one or more functional layers such as the sample placement layer 11, the heating layer, the thermal conductive layer 13 and the chip substrate as required, and its function is to reduce the lateral heat conduction of the sample heat between the adjacent temperature control units 12, and to enhance the dominance of longitudinal heat conduction in the thickness direction of the thermal conductive layer 13. In a specific setting, a manner is that one end of the thermal insulation element 15 extends into interior of the chip substrate 14, and the other end is close to the thermal conductive layer 13 or the other end extends into interior of the sample placement layer 11. A manner is that one end of the thermal insulation element 15 extends into interior of the thermal conductive layer 13, and the other end extends into interior of the sample placement layer 11. A manner is that the thermal insulation element 15 is disposed inside the thermal conductivity layer 13, and one end of the thermal insulation element 15 is close to the gap between adjacent temperature control units 12, and the other end is close to the chip substrate 14. For the number of temperature control unit 12 is one, a plurality of thermal insulation elements 15 may be provided around the temperature control unit 12. In some cases, air or vacuum can also be sealed between adjacent temperature control units 12, which can reduce the interference between adjacent local temperature control regions N, improve the temperature uniformity at the edge of the region, and reduce the heating power while maintaining the sample temperature, save resources. The above is only a schematic illustration, and the present disclosure does not limit the possible arrangement of the thermal insulation element 15.

The specific embodiment shown in the above FIGS. 2*a* to 2*e* is used as a schematic illustration. The sample placement layer and the heating layer are an integrated structure. Compared with the design of the interface between the sample and the heating layer in the prior art, the sample layer and the heating layer are integrated in the present disclosure, there is no interface between the two layers, which is conducive to heat transfer, and the freezing rate exceeds $10^{5\circ}$ C./s, much higher than the maximum freezing rate of $2\times10^{4\circ}$ C./s in the prior art.

In addition, due to the integrated structure of the sample layer and the heating layer, the contact surface between the two layers is flat, which can reduce scattering, improve light transmittance, and facilitate the detection of subsequent samples. At the same time, due to the integrated structure between the sample layer and the heating layer, there is no defect of incomplete contact between the heating layer and the sample layer in the prior art, which can ensure the stability of heat conduction performance, greatly improve the heat transfer efficiency, and is conducive to rapid freezing. In the present disclosure, the stability of thermal conductivity refers to that the temperature-time curve of the freezing speed of each freezing of refrigeration chips is basically consistent, and the reproducibility is good, or the temperature-time curves of the freezing speed of refrigeration chips produced in different batches are basically the same.

As another embodiment, the sample placement layer and the heating layer have an integrated structure, and the thermal conductive layer and the chip substrate can also be arranged separately in sequence. In use, the sample placement layer, the heating layer, the thermal conductive layer, and the chip substrate are stacked in sequence, and fixed with an external fixture. The thermal conductive layer and the chip substrate layer can also be integrated with the sample placement layer and the heating layer, such as using the chip micro-nano processing technology to combine them into one layer.

As another embodiment, the sample placement layer and the heating layer can be arranged separately, but the inventors found that compared with the design of the integrated structure of the sample placement layer and the heating layer, the sample placement layer arranged separately leads to generate a new thermal resistance between the layers, which affects the freezing speed of the refrigeration chip. The freezing effect is not as good as the freezing effect of the integrated structure, but the freezing rate of the blank chip can also reach $10^{5\circ}$ C./s, the freezing rate when freezing samples can reach $5\times10^{4\circ}$ C./s. Although the separate arrangement between the sample placement layer and the heating layer affects the freezing effect, it can also meet the needs of samples with slightly lower freezing rate requirements. The sample placement layer is set independently, and the number of sample placement layers can be flexibly set as required, and when a sample placement layer is damaged, it can be replaced in time.

According to the embodiment of the present disclosure, the overall thickness of the refrigeration chip 10 is controlled to be 0.1 to 2 mm.

According to an embodiment of the present disclosure, the refrigeration chip is provided with an optical path channel, so that a test device can be adapted to perform in-situ characterization of the sample, such as a microscope, an X-ray device, etc., so as to realize the in-situ real-time test of freezing the sample and improve the test efficiency. Specifically, the refrigeration chip 10 is made of a light-transmitting material or has perforated channels as the optical path channel, so as to be suitable for a test device such as an upright optical microscope, an electron microscope, a photodetector, an X-ray, a Raman spectrometer, an infrared spectrometer, etc.

In the embodiment of the present disclosure, a test device is usually adapted to perform in-situ characterization of the sample in the upper region of the placed sample, for example, an upright optical microscope is adapted for microscopic observation. When a perforated channel is arranged on the refrigeration chip, an inverted optical microscope can be adapted for microscopic observation. It should be noted that the heat conduction of the sample along the thickness direction of the thermal conductive layer may be affected by the perforated channel, but this change has little effect on the freezing speed of the sample. In the embodiment of the present disclosure, the aperture of the perforated channel can be flexibly adjusted, which is not limited in the present disclosure.

Those of ordinary skill in the art can understand that, according to design requirements, the above-mentioned sample placement layer, thermal conductive layer, and chip substrate may be discontinuous, and they can be opened and/or grooved to adjust thermal conductivity or facilitate optical observation.

Figure 3:
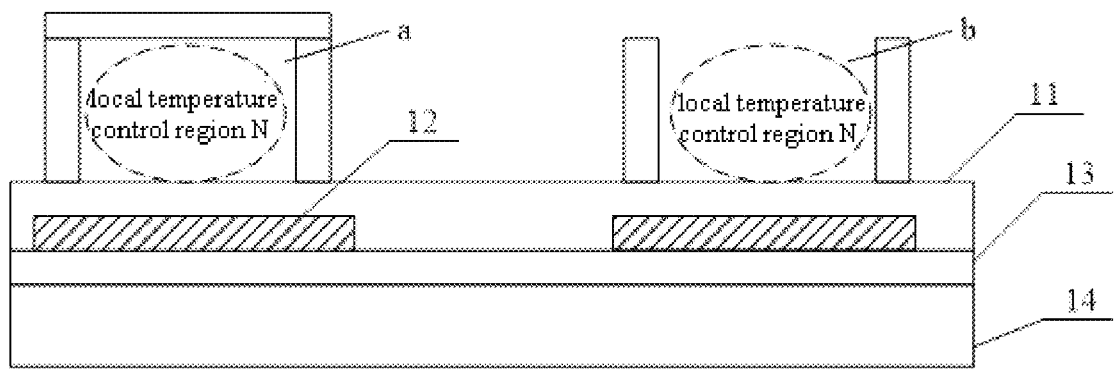
FIG. 3 shows a schematic structural diagram of a refrigeration chip according to an embodiment of the present disclosure.

FIG. 3 shows a schematic structural diagram of a refrigeration chip according to an embodiment of the present disclosure. As shown in FIG. 3, different from FIG. 1, the local temperature control region is provided with at least one of a closed sample containing cavity 'a' and/or a open sample containing cavity 'b' for accommodating samples. For other technical contents of the refrigeration chip according to the embodiment of the present disclosure, refer to the embodiments shown in FIG. 1, which will not be repeated here.

According to an embodiment of the present disclosure, the temperature control unit 12 further comprises an auxiliary temperature control unit disposed on the wall of the closed sample containing cavity 'a' and/or the open sample containing cavity 'b'. for reducing temperature differences between multiple samples placed within the same local temperature control region. In this embodiment, the auxiliary temperature control unit and the temperature control unit may use the same components or equivalent components.

Figure 4:
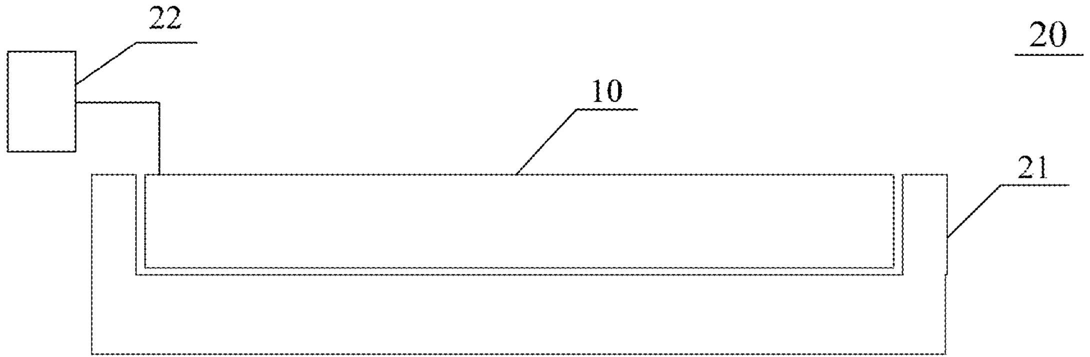
FIG. 4 shows a schematic structural diagram of a sample stage assembly according to an embodiment of the present disclosure.

FIG. 4 shows a schematic structural diagram of a sample stage assembly according to an embodiment of the present disclosure. As shown in FIG. 4, the sample stage assembly 20 comprises: a refrigeration chip 10, a sample heat sink 21 and a controller 22. Wherein, the sample heat sink 21 is used for accommodating the refrigeration chip 10. The controller 22 is electrically connected to the temperature control unit 12 for adjusting the temperature of the temperature control unit 12. It should be noted that, the sample heat sink 21 can be designed as a light-transmitting structure, so as to be suitable for observing the sample by a microscope.

In the embodiment of the present disclosure, the thermal resistance between the sample heat sink 21 and the low-temperature cold source in the sample stage assembly 20 is very small, the heat transfer speed is fast, and the temperature is close to that of the low-temperature cold source in the equilibrium state, which can be used as the low-temperature cold source A. It can be understood that the sample heat sink 21 can also be omitted, and the refrigeration chip 10 can be directly placed on the heat sink base 32 described below. At this time, the heat sink base 32 can be regarded as a low-temperature cold source A, which is not limited in this disclosure.

In the embodiment of the present disclosure, the sample stage assembly 20 further comprises a control circuit board (not shown in the figures), and the control circuit board can be embedded in the sample heat sink 21 or arranged around the area where the sample heat sink 21 is in direct contact with the refrigeration chip 10, as long as the efficient heat transfer of the two parts is not affected. The present disclosure does not limit the position of the control circuit board. The controller 22 is electrically connected to the temperature control unit 12 through a control circuit board, so as to adjust the temperature of the temperature control unit 12.

Figure 5:
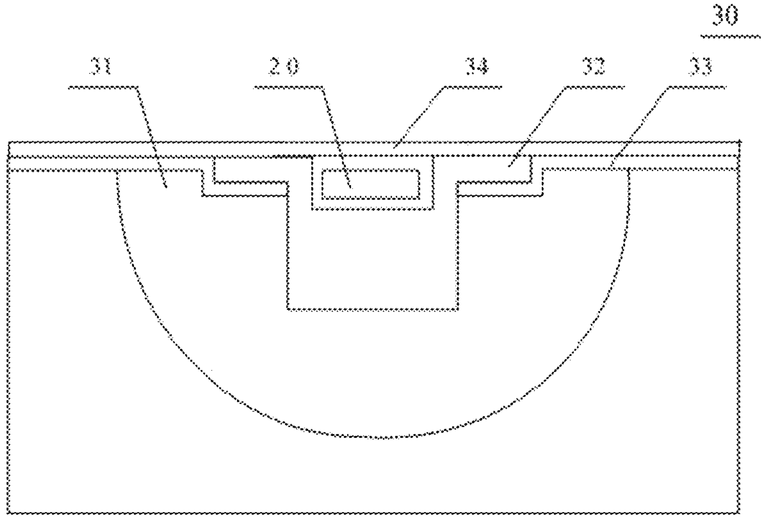
FIG. 5 shows a schematic structural diagram of a refrigeration system according to an embodiment of the present disclosure.

FIG. 5 shows a schematic structural diagram of a refrigeration system according to an embodiment of the present disclosure. As shown in FIG. 5, the refrigeration system 30 comprises: a sample stage assembezly 20, a low-temperature cold source 31 and a heat sink base 32. The low-temperature cold source 31 may be liquid nitrogen, which is used to cool the heat sink base 32 and keep it close to the temperature of liquid nitrogen. The heat sink base 32 is used to fix the sample stage assembly 20 and serve as a cold source to freeze the sample stage assembly 20.

According to the embodiment of the present disclosure, when the sample is frozen, the heat sink base 32 is in direct contact with the sample heat sink 21, so that the temperature of the sample heat sink 21 is close to the liquid nitrogen temperature or the same as the liquid nitrogen temperature. Other parts outside the local temperature control region N are also frozen at the same time. The controller 22 adjusts the electrical parameters of the temperature control unit 12, and the sample is directly cooled by other parts of the chip and the sample heat sink 21 whose ambient temperatures are close to or equal to the temperature of liquid nitrogen.

According to an embodiment of the present disclosure, the refrigeration system 30 further comprises: a freezing medium sealing cover plate 33, which is used to seal the low-temperature cold source, and in some cases can also support the heat sink base 32 to immerse in the low-temperature cold source.

According to an embodiment of the present disclosure, the refrigeration system 30 further comprises: a sample cover plate 34 the area of which is at least capable of sealing the opening of the heat sink base 32. The length of the sample cover plate 34 shown in the figure extends to the two ends of the freezing medium sealing cover plate 33 respectively. Such kind of setting is to ensure that in the low temperature environment where the refrigeration chip is located, no water vapor will enter and prevent the water vapor from condensing and forming droplets to adhere to the sample, so as to avoid that the droplets form ice crystals in the low temperature environment to affect the microscopic observation or property characterization of the sample. It can be understood that when the area of the sample cover plate 34 is sufficient to cover the sample heat sink, the low temperature environment where the refrigeration chip is located can usually be sealed to prevent water vapor from entering. On this basis, the length of the sample cover plate 34 can be appropriately increased, which is not limited in the present disclosure.

In the present disclosure, the sample cover plate 34 may also be provided with an observation area or a detection area, so that under the premise of preventing the entry of water vapor in a low temperature environment, the properties of the sample are characterized by microscopically observing the sample through the observation area and/or by using a detection device at the position of the detection area. In some cases, a low temperature environment can be provided with a dry atmosphere to solve the defect that water vapor condensation affects the observation or characterization of the sample, and in this case, the sample cover plate 34 can be omitted.

The present disclosure also provides a sample testing system, comprising a refrigeration system 30 and a microscopic observation device and/or a detection device used in conjunction with the refrigeration system 30.

According to an embodiment of the present disclosure, the microscopic observation device is at least one of an upright optical microscope and an electron microscope. The detection device is at least one of monitoring instruments such as photodetectors, X-rays, Raman spectrometers, and infrared spectrometers.

Figures 6, 7:
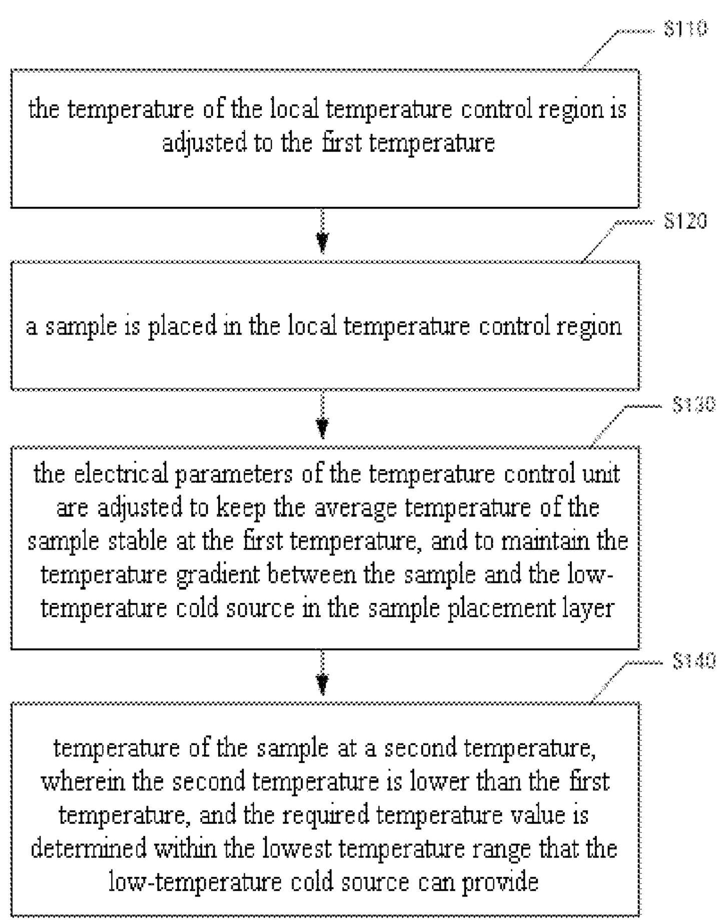
FIG. 6 shows a schematic flowchart of a method for freezing a sample according to an embodiment of the present disclosure.
FIG. 7 shows a schematic diagram of the basic principle of the operation of the temperature control unit according to an embodiment of the present disclosure.

FIG. 6 shows a schematic flowchart of a method for freezing a sample according to an embodiment of the present disclosure. As shown in FIG. 6, the method utilizing the refrigeration system 30 to freeze the sample, comprises the following steps S110 to S140.

In step S110, the temperature of the local temperature control region is adjusted to the first temperature.

In the disclosed method, firstly, at room temperature, the control circuit board is connected to the controller. Secondly, the controller is started up to heat the temperature control unit to a set temperature slightly higher than the room temperature (the temperature of the temperature control unit is determined by measuring the resistance value in real time, such as 30° C.), and keep it constant at this temperature (which is adjusted by resistance feedback). Since the distance between the temperature control unit and the sample is extremely small and the thermal resistance is extremely low, it can be approximately considered that the sample temperature is also at the set temperature (Such as 30° C.), the typical resistance value range at this time is Rheater=50 to 100 ohm.

In step S120, a sample is placed in the local temperature control region.

In step S130, the electrical parameters of the temperature control unit are adjusted to keep the average temperature of the sample stable at the first temperature, and to maintain the temperature gradient between the sample and the low-temperature cold source in the sample placement layer.

In the embodiment of the present disclosure, the sample stage assembly is placed on the frozen heat sink base (about −190° C.), and the temperature of the refrigeration chip begins to decrease. At this time, the controller automatically increases the current Iheater to perform resistance heating. The average temperature of the sample in the local temperature control region N is maintained at the first temperature (for example, 30° C.). At this time, the typical current value range is Iheater=50 to 100 mA, and the typical power (Rheater*Iheater2) of the Rheater is about 0.3 W.

In step S140, the electrical parameters is detected and adjusted to a first predetermined range, so as to adjust the average temperature of the sample at a second temperature, wherein the second temperature is lower than the first temperature, and the required temperature value is determined within the lowest temperature range that the low-temperature cold source can provide.

In the embodiment of the present disclosure, when freezing is required, the controller sends a signal to suddenly reduce the current Iheater to 0.1 to 1.0 mA, the temperature of the sample in the local temperature control region N will rapidly drop to the temperature of the heat sink base 31, and the Rheater is also sharply reduced to about 1/7 of the Rheater at room temperature. During the entire cooling process, the control circuit maintains a small constant current (0.1 to 1.0 mA) for continuous measurement of the change of the Rheater as a reference for temperature changing over time. After the freezing is finisheds, the control circuit maintains a small current (0.1 to 1.0 mA), maintains the average temperature of the sample at the second temperature (such as −190° C.), and continuously monitors the change of the Rheater, which is used as a reference for the sample temperature.

In the embodiment of the present disclosure, the second temperature is determined according to the temperature of the low-temperature cold source A, and may not be lower than this temperature. Specifically, when the low-temperature cold source A can provide a low temperature of −190° C., the temperature of the sample can be adjusted to a desired temperature, for example, it can be −140° C.

It should be noted that step S110 and step S120 are steps performed before the sample stage assembly is disposed into the heat sink base. In step S110, the temperature of the local temperature control region can also be room temperature, in this case, it is not necessary to start up the controller to heat the temperature control unit. In addition, the execution order of step S110 and step S120 may be interchanged, which is not limited in the present disclosure.

The basic principles of the operation of the temperature control unit are explained as follows:

FIG. 7 is a schematic diagram showing the basic principle of the operation of the temperature control unit according to the embodiment of the present disclosure. As shown in FIG. 7, the temperature control unit is connected by a 4-terminal measurement method, that is, Force_H(I+), Sense_H(V+), Sense_L(V−), Force_L(I−). The heating current Iheater is applied by I+ to I−, and this current can reach the maximum magnitude of 50 to 200 mA. At the same time, the voltage difference Vheater is measured at the two terminals of V+ and V−, the terminal current at the two terminals is very small (such as virtual ground), and the influence on the current passing through the temperature control unit is omitted. The resistance value Rheater of the temperature control unit is measured in real time by Vheater/Iheater, and the average temperature of the temperature control unit is evaluated based on this measurement. Therefore, the real-time monitoring of the heat conduction performance can be realized by monitoring the heating power of the temperature control unit in real time.

It should be noted that, in the embodiments of the present disclosure, the function of local selective freezing can be realized by controlling the temperature control units corresponding to different local temperature control regions. The temperature control units and the local temperature control regions can be in a one-to-one correspondence. Alternatively, one temperature control unit can be used to adjust the temperature of multiple local temperature control regions as required. Those skilled in the art can freely combine the temperature control manners, which can be used to realize the function of rapidly freezing samples, which are not limited in the present disclosure.

According to an embodiment of the present disclosure, the average temperature of the sample is adjusted by adjusting electrical parameters. Wherein, the electrical parameters may be current, resistance or power parameters, which are not limited in the present disclosure.

In the embodiment of the present disclosure, the temperature control unit can be used to measure the temperature of the sample in real time while heating the sample, or a temperature measurement unit can be separately set on the refrigeration chip, the temperature control unit is used to heat the sample, and the temperature measurement unit is used to measure the temperature of the sample in real time at the same time. The above mentioned details are not limited in the present disclosure.

In the embodiment of the present disclosure, a curve of resistance versus time can be plotted, and then the cooling rate of the sample can be estimated according to the curve of resistance versus time. Specifically, the Rheater can be calculated by measuring the Vheater under the condition of keeping the Iheater current constant, and the curve of the Rheater variation with time during the cooling process can be continuously monitored, and the curve can be used as a reference for evaluating the freezing speed of the sample.

According to an embodiment of the present disclosure, the first temperature to the second temperature is changed within a predetermined time period.

In the embodiment of the present disclosure, the predetermined time period for reducing the first temperature to the second temperature is controlled within 10 ms, for example, 1 to 2 ms. Specifically, within 1 ms, the temperature decreases from room temperature to below −140° C., and further decreases to below −180° C. in the following 1 to 2 ms.

According to an embodiment of the present disclosure, the time delay may be a delay time from when the control system sends an electrical signal for reducing the first temperature to when the refrigeration chip receives the electrical signal and starts to freeze the sample. It can be understood that, when testing a biological sample, it is necessary to determine a time point for freezing the biological sample, so as to observe the sample at this time point or perform other tests. The time delay reflects the delay time of the freezing operation. The smaller the time delay is, the more precise the time point of freezing the sample can be controlled, so that the state of the sample after freezing is performed is close to the state of the sample during the freezing operation, so that the sample can be tested better.

According to the embodiments of the present disclosure, by optimizing the circuit structure and control method of the temperature control unit, the time delay can be controlled to be less than 0.1 ms.

According to an embodiment of the present disclosure, the first temperature is the liquid temperature of the sample, for example, an aqueous solution under normal pressure, and for conventional cell samples, the temperature is in the range of 0 to 40° C., preferably 20 to 30° C. For special heat-resistant cells or bacteria, the temperature can be increased. Under unnormal pressure conditions, the temperature range may also be changed to ensure that the culture medium is in a liquid state and the biological sample survives normally.

According to an embodiment of the present disclosure, the second temperature is a temperature at which the same sample is directly transformed from the liquid state to the amorphous solid state in the same environment, and the amorphous solid state is maintained continuously. For example, for water or a general aqueous solution, the temperature should be lower than −140° C. Under high pressure or low pressure, the temperature range may be changed to ensure that the culture medium is frozen to an amorphous stable temperature without damaging the sample structure.

According to an embodiment of the present disclosure, at the same time as step S310, the thermal conduction performance between the refrigeration chip and the cold source may also be evaluated according to electrical parameters. The evaluation of the heat conduction rate between the refrigeration chip and the cold source is realized according to the resistance value of the aforementioned temperature control unit, which is not repeated here. It should be pointed out that before freezing the sample, it is helpful to improve the success rate of the experiment to determine whether the thermal conductivity meets the requirements according to the heating power of the temperature control unit. Too slow heat transfer will lead to insufficient freezing speed, while too fast heat transfer will lead to an increase in the power required to maintain the first temperature, and may also lead to insufficient cooling power of the cold source, which are not conducive to sample preparation. Using the structure that the thermal conductive layer is integrated with the sample placement layer, but separated from the cold source, the contact surface between the heating layer and the cold source can be adjusted during operation such as re-contacting after cleaning, or adjusting the contact force to optimize the thermal conductivity, to meet the needs. In the prior art, the structure in which the thermal conductive layer is integrated with the cold source, but separated from the sample, does not have this function.

Figure 8:
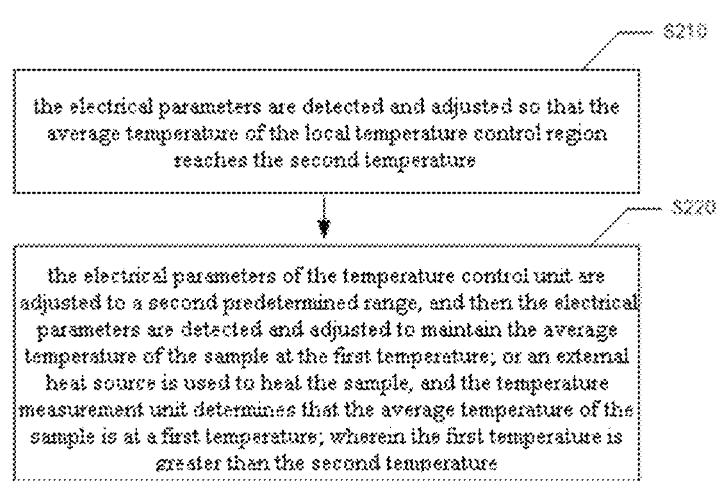
FIG. 8 shows a schematic flowchart of a method for heating a sample according to an embodiment of the present disclosure.

FIG. 8 shows a schematic flowchart of a method of heating a sample according to an embodiment of the present disclosure. As shown in FIG. 8, the method utilizing the refrigeration system 30 to heat the sample, comprises the following steps S210 to S220.

In step S210, the electrical parameters are detected and adjusted so that the average temperature of the local temperature control region reaches the second temperature.

In the embodiment of the present disclosure, firstly, under the condition of low temperature (at the temperature of liquid nitrogen), the temperature control unit is connected with the controller. Secondly, the control circuit is started, and the set value of IHeater is 0.1 to 1.0 mA (only for measuring resistance value to evaluate temperature, heating can be ignored), the temperature of the temperature control unit is close to the temperature of the heat sink.

In step S220, the electrical parameters of the temperature control unit are adjusted to a second predetermined range, and then the electrical parameters are detected and adjusted to maintain the average temperature of the sample at the first temperature; or an external heat source is used to heat the sample, and the temperature measurement unit determines that the average temperature of the sample is at a first temperature; wherein the first temperature is greater than the second temperature.

In the embodiment of the present disclosure, when the temperature of the temperature control unit is close to the temperature of the heat sink, the IHeater is suddenly increased, and the Rheater is heated to the Rheater value corresponding to the set temperature (eg, 30° C.) at the fastest speed. During this process, since the resistance value of the initial Rheater at the liquid nitrogen temperature is only about 1/7 of the resistance value of the initial Rheater at the room temperature, the initial heating current will be very high to achieve a power equivalent to 0.3 W, so as to achieve the purpose of rapid heating. At the same time, due to the rapid increase of the resistance value during the heating process, the Iheater needs to be quickly adjusted (lowered) to a reasonable range, so as to maintain the Rheater at the set value (such as the Rheater corresponding to 30° C.). Then, the heating element is maintained at a set temperature (eg, 30° C.), the sample can be removed as needed, or the sample can continue to be frozen.

In the present disclosure, by using an external heat source to performing focus, the heating area is limited to a local temperature control region on the refrigeration chip to heat the sample, and then controlling the heating power and temperature can be realized by cooperating with the feedback system on the refrigeration chip. For example, a temperature measurement unit can be set on the refrigeration chip to monitor the sample temperature in real time, and then control the heating power of the external heat source. Wherein, the external heat source may be microwaves, lasers, and the like.

It should be noted that, after using the refrigeration chip to freeze the sample, step S210 may be omitted, and step S220 may be directly performed to heat the sample.

In the method for heating a sample provided by the embodiment of the present disclosure, the refrigeration system is used to heat the sample. The specific technical details can be with reference with the embodiment shown in FIG. 5, which will not be repeated here.

According to an embodiment of the present disclosure, the second temperature is changed to the first temperature within a predetermined time period.

According to an embodiment of the present disclosure, the predetermined time period is within 10 ms, for example, 1 to 2 ms.

According to an embodiment of the present disclosure, the first temperature is the liquid temperature of the sample, for example, an aqueous solution under normal pressure. For conventional cell samples, the temperature is in the range of 0 to 40° C., preferably 20 to 30° C. For special heat-resistant cells or bacteria, the temperature can be increased. Under unnormal pressure conditions, the temperature range may also be changed to ensure that the culture medium is in a liquid state and the biological sample survives normally.

According to an embodiment of the present disclosure, the second temperature is a temperature at which the same sample is directly transformed from the liquid state to the amorphous solid state in the same environment, and the amorphous solid state is maintained continuously. For example, for water or a general aqueous solution, the temperature should be lower than −140° C. Under a high pressure or a low pressure, the temperature range may be changed to ensure that the culture medium is frozen to an amorphous stable temperature without damaging the sample structure.

Figure 9:
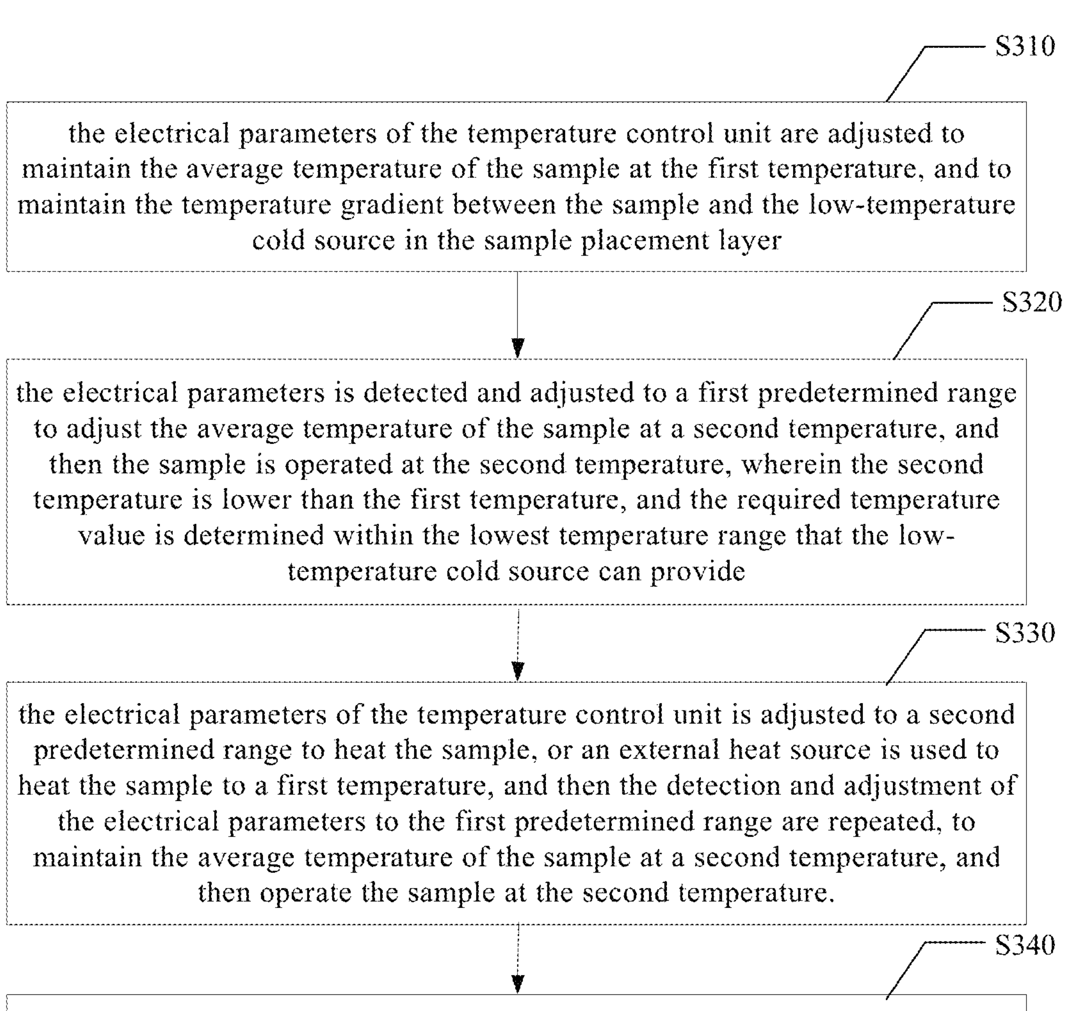
FIG. 9 shows a schematic flowchart of a method for microscopically observing a sample according to an embodiment of the present disclosure.

FIG. 9 shows a schematic flowchart of a method of operating a sample according to an embodiment of the present disclosure. As shown in FIG. 9, the method utilizes the sample testing system to operate the sample, comprising the following steps S310 to S340.

In step S310, the electrical parameters of the temperature control unit are adjusted to maintain the average temperature of the sample at the first temperature, and to maintain the temperature gradient between the sample and the low-temperature cold source in the sample placement layer.

In step S320, the electrical parameters is detected and adjusted to a first predetermined range to adjust the average temperature of the sample at a second temperature, and then the sample is operated at the second temperature, wherein the second temperature is lower than the first temperature, and the required temperature value is determined within the lowest temperature range that the low-temperature cold source can provide.

In step S330, the electrical parameters of the temperature control unit is adjusted to a second predetermined range to heat the sample, or an external heat source is used to heat the sample to a first temperature, and then the detection and adjustment of the electrical parameters to the first predetermined range are repeated, to maintain the average temperature of the sample at a second temperature, and then operate the sample at the second temperature.

In step S340, after the sample is operated, the sample is replaced.

It should be noted that step S340 can be performed after heating the sample to the first temperature in step S320, that is, after the sample is operated at the second temperature for one time, and after the sample is heated to the first temperature, the sample can be repeatedly frozen as needed. After the sample is operated for the second time, the sample is heated to the first temperature and then the operation is terminated. The present disclosure does not limit the number of cycles of freezing, heating, and re-freezing. It can be understood that after the operation is completed in step S320, a new sample can also be replaced at the first temperature, and then the new sample can be repeatedly frozen for the operation, which is not limited in the present disclosure.

For the method for operating a sample provided by the embodiment of the present disclosure, the specific technical details refer to the embodiments shown in FIGS. 6 and 8, which is not repeated here.

According to an embodiment of the present disclosure, the operation sample may be a microscopic observation sample, a test sample, which is detected under monitoring instruments such as a photodetector, X-ray, Raman spectrometer, infrared spectrometer, etc., which is not limited in the present disclosure.

According to an embodiment of the present disclosure, in step S310, the electrical parameters of the temperature control unit are adjusted to maintain the average temperature of the sample at the first temperature, and after the step of maintaining the temperature gradient between the sample and the low-temperature cold source in the sample placement layer, the Methods further comprise:

operating the sample at a first temperature and determining a start-up time for adjusting the electrical parametesr to a first predetermined range, and at the start-up time, detecting and adjusting the electrical parameter to the first predetermined range to maintain the average temperature value of the sample at the second temperature.

According to an embodiment of the present disclosure, the first temperature to the second temperature is changed within a first predetermined time period.

According to an embodiment of the present disclosure, the electrical parameters of the temperature control unit are adjusted by an electronic equipment. For example, by using keithley 2612B to adjust the electrical parameters of the temperature control unit, the time delay can be controlled within 2 ms.

According to the embodiments of the present disclosure, by optimizing the circuit structure and control method of the temperature control unit, the time delay can be controlled to be less than 0.1 ms.

According to an embodiment of the present disclosure, the second temperature is changed to the first temperature within a second predetermined time period.

According to an embodiment of the present disclosure, the second predetermined time period is within 10 ms, for example, 1 to 2 ms.

According to an embodiment of the present disclosure, the first temperature is the liquid temperature of the sample, for example, an aqueous solution under normal pressure, and for conventional cell samples, the temperature is in the range of 0 to 40° C., preferably 20 to 30° C. For special heat-resistant cells or bacteria, the temperature can be increased. Under unnormal pressure conditions, the temperature range may also be changed to ensure that the culture medium is in a liquid state and the biological sample survives normally.

According to an embodiment of the present disclosure, the second temperature is a temperature at which the same sample is directly transformed from the liquid state to the amorphous solid state in the same environment, and the amorphous solid state is maintained continuously. For example, for water or a general aqueous solution, the temperature should be lower than −140° C. Under high pressure or low pressure, the temperature range may be changed to ensure that the culture medium is frozen to an amorphous stable temperature without damaging the sample structure.

The method used to operate the sample by the sample testing system according to the embodiment of the present disclosure, by adjusting the parameters of the temperature control unit, the operation flow of the freezing the sample operating the sample, or the cycle of the procedure of freezing the sample—operating the sample—heating to revive the sample—freezing the sample—operating the sample—heating to revive the sample, or the operation flow of operating the sample before freezing—freezing the sample—operating the sample, or the cycle of the procedure of operating the sample before freezing—freezing the sample—operating the sample—heating to revive the sample-operating the sample before freezing—freezing the sample—operating the sample—heating to revive the sample can be realized. Or, after freezing the sample—operating the sample, the above procedure can be repeated after changing the sample. This technical solution limits the heat capacity of the local temperature control region by designing the thermal resistance and heat exchange efficiency of each interface among the local temperature control region, the chip substrate and the low-temperature cold source, and obtains the freezing and heating speed higher than $10^{5}$° C./s, to ensure that the sample structure and function are not damaged (or the damage is mitigated) during repeated freezing and heating processes, which is a major improvement for biological sample freezing, in-situ observation and heating and thawing operations, which is of great significance and broad application prospects.

The following will specifically describe the manner in which the sample testing system provided by the embodiment of the present disclosure is used for microscopic observation of the sample.

Method 1: Placing the sample in the local temperature control region—keeping it to the first temperature—freezing to the second temperature—microscopic observation. This method is suitable for protein samples, and high-resolution microscopic observation is performed after freezing the sample.

Method 2: Placing the sample in a local temperature-controlled area—keeping it to the first temperature—real-time microscopic observation—starting up freezing at a specific time node—keep it to the second temperature—high-resolution microscopic observation. This method is suitable for cell samples, and sample activity can be observed in real-time firstly, freezing the sample is performed at specific time points of interest, such as cell division and when cells engulf foreign material, and then high-resolution microscopy is performed.

It should be noted that the microscopes used for real-time microscopic observation before freezing and after freezing can be different, so as to realize observation with different resolutions. For example, a conventional upright optical microscope is used to observe the sample in real time, and an electron microscope is used to perform high-resolution observation on the structure of the cells after freezing.

In the method for microscopic observation of samples provided by the embodiments of the present disclosure, the cell samples are frozen from 20 to 30° C. to about −170° C. The consumed time is less than 2 ms, and the freezing speed is higher than $10^{5}$° C./s to ensure that the shape of the cell sample remains basically unchanged after freezing, and neither rupture nor obvious deformation occurs.

The above description is merely a preferred embodiment of the present disclosure and an illustration of the technical principles employed. It should be understood by those skilled in the art that the scope of the invention involved in the present disclosure is not limited to the technical solutions formed by the specific combination of the above technical features, and should also cover other technical solutions formed by any combination of the above technical features and their equivalent features without departing from the inventive concept. For example, a technical solution is formed by replacing the above features with the technical features disclosed in the present disclosure (but not limited to) with similar functions.

The invention claimed is:

1. A refrigeration chip, wherein, the refrigeration chip is configured to be positioned in contact with a low-temperature cold source, and the refrigeration chip comprising: a heating layer, a thermal conductive layer, and a chip substrate arranged in sequence, with the thermal conductive layer positioned between the heating layer and the chip substrate;

wherein, the heating layer comprises a plurality of temperature control units disposed on the thermal conductive layer; and the heat generated by at least one temperature control unit of the plurality of temperature control units is configured to be transferred to the low-temperature cold source along a thickness direction of the thermal conductive layer, wherein a thermal conductivity of the chip substrate is greater than a thermal conductivity of the thermal conductive layer, and wherein the refrigeration chip further comprises a thermal insulation element arranged laterally between adjacent temperature control units of the plurality of temperature control units.

2. The refrigeration chip according to claim 1, wherein, each of the plurality of temperature control units is an assembly formed by a plurality of heating elements arranged in an array, or a heating element with a predetermined surface area.

3. The refrigeration chip according to claim 1, further comprising:

a sample placement layer, which is located on the heating layer, and the surface of the sample placement layer has a local temperature control region for placing the sample, and an area of the local temperature control region corresponds to a surface area of a respective temperature control unit of the plurality of temperature control units.

4. The refrigeration chip according to claim 3, wherein, the local temperature control region is provided with one or more of at least one closed sample containing cavity or open sample containing cavity for containing the sample.

5. The refrigeration chip according to claim 4, wherein, the plurality of temperature control units further include an auxiliary temperature control unit disposed on one or more of the wall of the closed sample containing cavity or the open sample containing cavity.

6. The refrigeration chip according to claim 3, wherein the sample placement layer and the heating layer are integrated with each other or separate from each other.

7. The refrigeration chip according to claim 1, wherein, the thermal conductivity of the thermal insulation element is not greater than the thermal conductivity of the thermal conductive layer, and the lateral thermal conductivity of the thermal insulation element is smaller than the lateral thermal conductivity of the thermal conductive layer.

8. The refrigeration chip according to claim 1, wherein the chip substrate supports the thermal conductive layer.

9. The refrigeration chip according to claim 8, wherein, the chip substrate is provided with an accommodating chamber for accommodating a low-temperature cold source.

10. The refrigeration chip according to claim 1, wherein, the refrigeration chip is provided with optical path channels to adapt to microscopes, photodetectors, X-rays, Raman spectrometers, and infrared spectrometers.

11. The refrigeration chip according to claim 10, wherein the refrigeration chip is made of a light transmissive material or has perforated channels as the optical path channels.

12. The refrigeration chip of claim 1, wherein, the refrigeration chip is made by the chip micro-nano processing technology.

13. The refrigeration chip according to claim 12, wherein, the thickness of the refrigeration chip is in a range from 0.1 to 2 mm, inclusive.

14. A refrigeration system, comprising:

a sample stage assembly having the refrigeration chip of claim 1 and a controller electrically connected to the plurality of temperature control units, the controller configured to adjust a temperature of at least one of the plurality of temperature control units;

a low-temperature cold source; and a heat sink base for fixing the sample stage assembly, which is in contact with the low-temperature cold source.

15. The refrigeration system according to claim 14, further comprising:

a freezing medium sealing cover plate, which is used for sealing the low-temperature cold source.

16. The refrigeration system according to claim 14, further comprising:

a sample cover, the area of which is capable of at least sealing the opening of the heat sink base.

17. A sample testing system comprising the refrigeration system according to claim 14, comprising;

one or more of a microscopic observation device or a detection device, wherein, the microscopic observation device is at least one of an upright optical microscope or an electron microscope; and the detection device is at least one of a photodetector, an X-ray, a Raman spectrometer, or an infrared spectrometer.

18. The refrigeration system according to claim 14, further comprising: a sample heat sink, in which the refrigeration chip is positioned.

* * * * *